Jan. 6, 1953  W. A. SCHNEIDER  2,624,221
SHEATH STRIPPER FOR CABLE HAVING TWISTED CONDUCTORS
Filed Jan. 9, 1948  2 SHEETS—SHEET 2

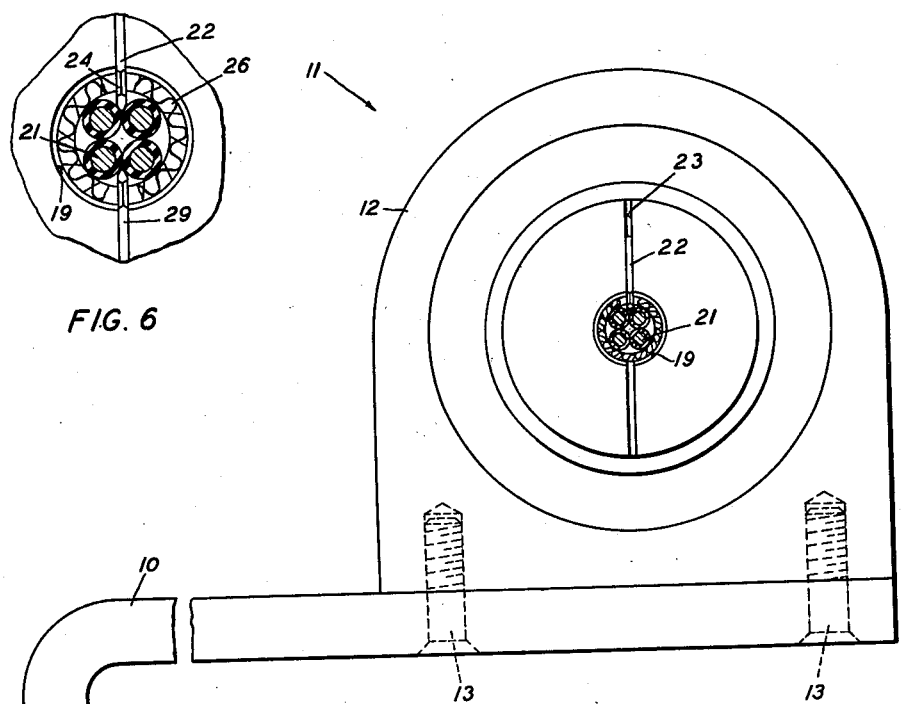
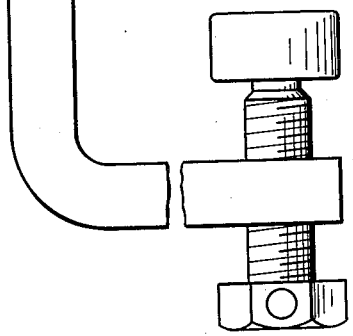

INVENTOR
W. A. SCHNEIDER
BY C. S. Hamilton
ATTORNEY

Patented Jan. 6, 1953

2,624,221

UNITED STATES PATENT OFFICE 2,624,221

SHEATH STRIPPER FOR CABLE HAVING TWISTED CONDUCTORS

William A. Schneider, Greensboro, N. C., assignor to Western Electric Company, Incorporated, New York, N. Y., a corporation of New York Application January 9, 1948, Serial No. 1,307

10 Claims. (Cl. 81—9.51)

This invention relates to stripping devices, and more particularly to a cutter for stripping insulation or sheath from cables having twisted conductors therein.

In the manufacture of electric cable, it is often necessary or desirable to remove the outside covering or sheath therefrom. The removal of the sheath requires great care and skill to prevent damage to the twisted conductors within the cable. Heretofore, it has been the practice to employ highly skilled operators with special training to manually remove the covering or sheath with a knife. The work was slow and difficult and frequently damage to the insulation of the conductors resulted in the scrapping of considerable cable.

An object of the invention is to provide new and improved methods and apparatus for stripping materials.

With the above and other objects in view, the invention may be embodied in an apparatus or device comprising a cutter blade which is pivotally mounted in a rotatable hollow support through which the cable having a sheath to be stripped is passed. The cutter blade penetrates the sheath of the cable and is inserted between a pair of twisted conductors within the cable so that the cutter blade is free to rotate and follow the convolutions of the conductors without damage to the insulation thereof during the stripping operation.

A complete understanding of the invention may be obtained from the following detailed description taken in conjunction with the accompanying drawings, in which:

Fig. 1 is a front elevational view of the cable stripper showing the cable inserted therein;

Fig. 4 is an enlarged fragmentary view of the center part of the cable stripper showing the cutter blade inserted between the twisted conductors in the cable;

Fig. 6 is an enlarged fragmentary view showing a modification wherein the rotatable bushing is provided with two cutter blades for severing the sheath of the cable.

Figure 3:
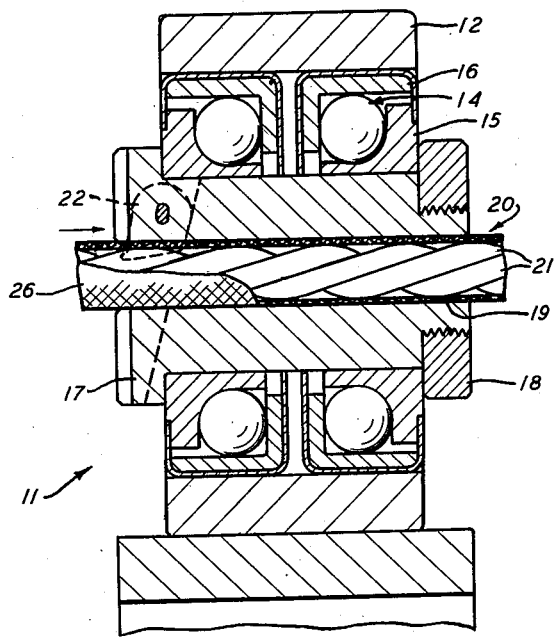
Fig. 3 is a vertical section taken along line 3—3 of Fig. 2.

Referring now to the drawings, wherein like reference numerals designate the same parts throughout the several views, a clamping bracket 10 is shown in Fig. 1 for securing to a work bench or table a stripping device 11 embodying the invention. The stripping device includes a housing 12 which is secured to the bracket 10 by four machine screws 13. Mounted within the housing 12 is a ball bearing assembly 14, an inner bearing ring 15 and an outer bearing ring 16. The outer bearing ring 16 is held stationary by means of a press fit to the housing 12. The inner ring 15, however, is freely rotatable on the ball bearings of the assembly 14.

Figure 2:
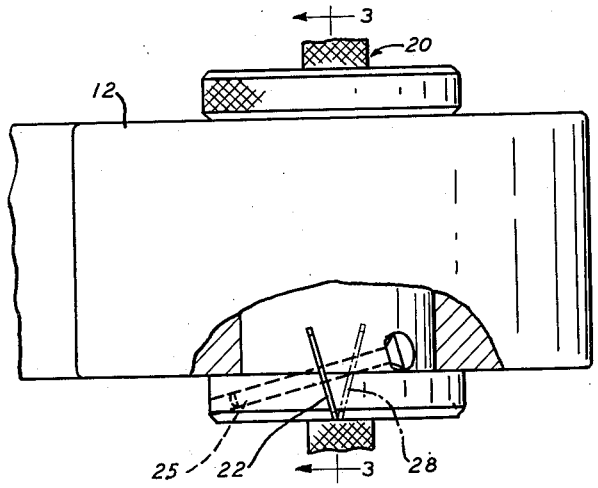
Fig. 2 is a plan view of the cable stripper, particularly showing the angular position of the cutter blade.

A rotatable bushing 17 is in sliding contact with the inner bearing ring 15 and has its right end threaded to receive a locking nut 18 as shown in Figs. 2 and 3. The locking nut 18 when tightened holds the inner ring 15 and the rotatable bushing 17 together so that they rotate as a unitary structure upon the bearings 14. In the center of the bushing 17 is a longitudinal bore 19 for the passage of a braided cable 20 therethrough, which cable in this particular instance is provided with four twisted conductors 21. The conductors 21 in the cable 20 as shown in Fig. 3 are twisted in a clockwise direction. The cable may consist of any number of conductors and may be twisted clockwise or counterclockwise.

Figure 5:
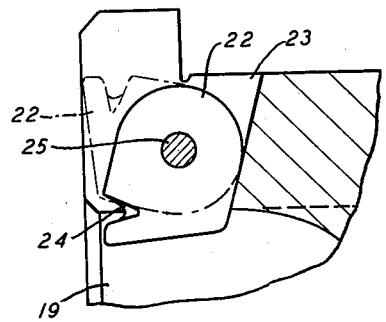
Fig. 5 is an enlarged fragmentary view of the rotatable bushing of the cable stripper showing the cutter blade pivoted therein.

A pivoted cutter blade 22 is mounted at the entrance of the bore 19 and extends partially into the bore. The blade 22 is set in a slot 23 (Figs. 2, 3 and 5) of the bushing 17 and has an indented cutting edge 24 which accomplishes the actual slitting of the braided covering of the cable 20. A pivot pin or screw 25 is secured at a predetermined angle in the bushing 17 to provide a pivot for the cutter blade 22 as shown in Figs. 2 and 5. The cutter blade 22 and the slot 23 are positioned at an angle to the longitudinal axis of the bushing 17 and intersects it; the angularity of the blade being so positioned that the lower portion of the blade may easily be inserted between a pair of the twisted conductors 21 to follow the convolutions thereof. The angle at which the cutter blade is positioned is determined by the degree of twist of the insulated conductors within the cable.

In performing a stripping operation, the cable 20 is introduced into the bore 19 at the left side of the bushing 17 (Fig. 3) and the lower portion of the blade 22 is inserted between two conductors 21 with the cutting edge 24 in severing position with the covering 26 of the cable. The cable 20 is then pushed through the bore 19, whereupon the operator grips the protruding end of the cable and pulls it through the stripper. As the cable moves in the direction indicated by the arrow in Fig. 3, the bushing 17 and the cutter blade 22 mounted therein rotate in the housing whereby the lower portion of the blade 22 follows the clockwise lay of the twisted conductors 21 so that the cutting edge 23 slits the braided covering 26 of the cable in a helical path. It is to be noted that the cutting edge of the blade 22 never touches the insulation of the conductors 21 in the cable thereby obviating any possibility that the latter may be damaged. After a predetermined or desired length of the sheath or covering is slit, the cable is pulled in a reversed direction through the bushing 17 whereby the cutter blade 22 is caused to move clockwise about its pivot 25 to the dotted line position as shown in Fig. 5 so that the cable may be quickly removed from the stripper 11 without interference from the cutter blade.

A modification of the cable stripper is shown in Fig. 6 wherein two cutter blades 22 and 29 are mounted in the rotatable bushing 17. With a plurality of cutter blades the sheath of the cable 20 will be slit into a plurality of helical strips.

When the covering of a cable having twisted conductors with a counterclockwise lay is to be slit, then another bushing having a slot and cutter blade positioned at a different angle as shown in dotted lines at 28 in Fig. 2 will be substituted. The operation of the stripping device in slitting a counterclockwise lay cable will be essentially the same as previously described for a clockwise lay cable with the exception that the blade and bushing will rotate in a counterclockwise direction.

It will be understood that the stripping device may be modified to slit any size cable and that the covering of the cable to be stripped may be textile, metal or any material.

Although the invention has been described with reference to particular embodiments, it is to be understood that various modifications may be made without departing from the scope of the invention as defined by the appended claims.

What is claimed is:

1. In a stripping device for slitting the covering on a core having a plurality of twisted elements, a rotatable member having a bore, means for supporting the rotatable member, and slitting means secured to and angularly positioned with respect to the axis of said rotatable member and extending into the bore thereof, said slitting means including a blunt portion positioned between adjoining elements of the core whereby the covering of the core is helically slit as the said blunt portion follows the twisted convolutions of the said elements as the core is moved lengthwise through the bore.

2. In a stripping device for slitting the covering on a core having a plurality of pairs of twisted elements, a rotatable member having a bore, means for supporting the rotatable member, a plurality of slitting members secured to the rotatable member and extending into the bore thereof and angularly positioned with respect to the axis of said rotatable member, and projections on said slitting members adapted to guide the slitting members when cutting the covering of the core into helical strips by cooperating with the convolutions of different pairs of twisted elements of the core.

3. In a stripping device for slitting the covering of a cable, a rotatable member having a bore therein, and a blade secured to the rotatable member and extending into the bore at an acute angle to the axis of the bore, said blade having a lower portion for insertion between a pair of twisted conductors in the cable and an indented cutting edge above said lower portion for slitting the covering of the cable when the cable is moved lengthwise to rotate the member by the blade following the convolutions of the twisted conductors.

4. In a cable stripping device for slitting the covering over twisted core elements of a cable, a rotatable member having a bore for passage of the cable therethrough, means for supporting the rotatable member, a cutter secured to said rotatable member and lying in a plane at an acute angle to the axis of the bore, and means carried by the cutter to guide the cutter along twisted elements of the cable to be stripped as the cable is pulled through the said bore to slit the covering of the cable.

5. In a cable stripping device for slitting the covering over twisted core elements of a cable, a rotatable member having a bore for the passage of the cable therethrough, means for rotatably supporting the member, slitting means mounted in said rotatable member and extending into the bore, and means connected with the slitting means to guide said slitting means, said guiding means being located in the bore and engaging the twisted core elements of the cable so as to rotate the member and the slitting means to helically slit the covering of the cable as it is pulled through the said bore.

6. In a cable stripping device for slitting the covering over twisted core elements, a rotatable member having a bore for passage of the cable therethrough, means for supporting the rotatable member, slitting means pivotally mounted on said rotatable member and lying in a plane at an acute angle to the axis of the bore, and a projection integral with said cutting means extending between twisted elements of the cable to be stripped to coact with said twisted elements for guiding the slitting means when the cable is pulled through said bore to cut the covering of the cable in a helical path.

7. In a cable stripping device for slitting a cable having twisted core elements, a rotatable member having a bore for passage of the cable therethrough, means for supporting the rotatable member, a cutter pivotally mounted on said rotatable member and partially extending into said bore, and means carried by the rotatable member to coact with the twisted elements of the cable to be stripped to rotate the cutter and rotatable member as the cable is pulled through the bore to cut the covering of the cable.

8. In a device for slitting the covering on a core having twisted elements, a rotatable member having a bore therethrough, means for supporting the rotatable member, pivoted slitting means secured to the rotatable member and lying in a plane making an acute angle with the axis of said rotatable member, and a projection integral with said slitting means located in the bore for coaction with a pair of twisted elements of the core, said slitting means adapted to helically slit the covering of the core and guided in the slitting of the covering by said projection.

9. In a device for slitting a covering on a cable having a plurality of twisted conductors, a rotatable element having a bore therein to guide the cable in a predetermined path, means for supporting the rotatable element, and a cutter mounted on the rotatable element having an indented cutting portion extending into the bore and also having a guide portion for insertion between a pair of twisted conductors of the cable.

10. A portable device for slitting the covering of a cable having twisted core element, comprising a housing, a member rotatably mounted in the housing and having a bore for guiding the cable, slitting means mounted on the rotatable member and extending into the bore, means connected with the slitting means and coacting with the twisted core elements for guiding the slitting means in a helical path as the cable is pulled through the bore, and means secured to the housing for clamping the portable device to a rigid support.

WILLIAM A. SCHNEIDER.

REFERENCES CITED

The following references are of record in the file of this patent:

UNITED STATES PATENTS

| Number | Name | Date |
|---|---|---|
| 346,679 | Parmelee | Aug. 3, 1886 |
| 420,982 | Zimmermann | Feb. 11, 1890 |
| 665,474 | Schmidt | Jan. 8, 1901 |
| 1,165,176 | Hornor | Dec. 21, 1915 |
| 1,306,588 | France | June 10, 1919 |
| 2,239,755 | Montgomery | Apr. 29, 1941 |